United States Patent Office 2,934,550
Patented Apr. 26, 1960

2,934,550
PREPARATION OF CYCLIC METHYLPOLYSILOXANES BY REACTING ORGANOPOLYSILOXANES WITH HALIDES OF ALUMINUM OR PHOSPHORUS

James Jack, Troon, Scotland, assignor to Imperial Chemical Industries Limited, London, England, a corporation of Great Britain No Drawing. Application December 8, 1958
Serial No. 778,609

Claims priority, application Great Britain
January 17, 1958

8 Claims. (Cl. 260—448.2)

This invention relates to the treatment of high molecular weight substantially linear polysiloxanes and to the preparation of low molecular weight cyclic polysiloxanes therefrom.

High molecular weight linear organopolysiloxanes, for example, such as polysiloxane elastomers and gums used for the production thereof are widely known and used. In the fabrication of articles from these materials, there is of necessity, a certain amount of waste, for example, flash from moulding, prematurely or partially cured material, e.g. arising from stock stored beyond its useful shelf life and the like. Since this material is relatively expensive any such waste adds considerably to the cost of the final fabricated article and it is most desirable to be able to convert such waste material to a readily re-utilizable form and to do this by a process not involving undue expenditure. One method which has been proposed for this purpose, is to treat a polysiloxane elastomer or gum with an anhydrous halogen acid to form a liquid product. The uses of this product are, however, limited and it is first necessary to remove or neutralise the halogen acid present. It has also been proposed to use a treatment with steam for this purpose. These methods, however, suffer from various disadvantages, e.g. the product obtained is not always in its most useful form and can frequently be used for only limited applications.

There has also been a proposal to prepare cyclic compounds of the general formula $(R_2SiO_2AlCl)_2$ where each R is the same or different and is a methyl, ethyl, or phenyl group by reacting substantially completely condensed organosiloxanes containing polymeric units of the general formula $R_2SiO$ with aluminium chloride under substantially anhydrous conditions. In these compounds the silicon and aluminium atoms are linked through an oxygen atom giving the linkage —Si—O—Al—. These compounds are crystalline solids, the alkyl compounds being capable of purification by distillation while the aryl compounds are not readily distilled but are best purified by recrystallization and all are hydrolysed by water to give siloxanes and hydrated aluminium chlorides.

According to the present invention a process for the production of low molecular weight cyclic methyl polysiloxanes comprises reacting together a high molecular weight substantially linear methyl polysiloxane with a substance from the class consisting of halides of aluminium and halides of phosphorus in an amount not more than 30% by weight at an elevated temperature under substantially anhydrous conditions and simultaneously distilling off the so produced cyclic polysiloxanes.

The methylpolysiloxanes to be treated may also contain other groups such as e.g. phenyl or vinyl groups but the low molecular weight cyclic polysiloxanes obtained by the process of my invention will not contain any phenyl or vinyl groups. By "high molecular weight" I mean of molecular weight not less than about 1000.

The material reacted may be in the form of a polysiloxane elastomer composition which will, of course, normally contain one or more fillers, pigments, etc. or may be in the form of a polysiloxane gum such as is used in the preparation of polysiloxane elastomers. Partially cured polysiloxane compositions may also be used and in addition, other high molecular weight linear polysiloxanes may be treated by this process. The advantages of the process are, however, of most value in the recovery of elastomers and gums.

Halides of aluminium and phosphorus which may be used in this process include aluminium chloride, aluminium fluoride, aluminium bromide, phosphorus trichloride, phosphorus pentachloride and phosphorus oxychloride. Aluminium chloride is, however, preferred, since it is relatively inexpensive and does not tend to contaminate the products.

The process of my invention is normally carried out by heating the reactants together in a vessel adapted for distillation and the low molecular weight cyclic polysiloxanes are distilled off as the reaction proceeds, the reaction being complete when there is no further distillation, usually after a few hours. It is normally preferred to operate at temperatures above 250° C. and it is further preferred to operate within the range 280 to 350° C.

The quantity of aluminium or phosphorus halides which may be used may vary widely, but should not exceed 30% by weight of the polysiloxane. Quantities of the order of 3 to 30% by weight of the polysiloxanes in the material to be treated are usually adequate. It is, however, preferred to use 5 to 15%.

My invention is further illustrated by the following examples in which all parts and percentages are by weight.

Example 1

75 parts of a polysiloxane composition consisting of 100 parts of a trimethylsilyl end-stopped dimethylpolysiloxane gum, 35 parts of a fume silica ("Aerosil" FK3), 3 parts of (tetramethylethylenedioxy)dimethylsilane and 3 parts of a paste containing 50% benzoyl peroxide in a polysiloxane oil ("Luperco" A.G.E.) were reacted with 3.8 parts of aluminium chloride by heating and stirring at 300° C. for 3 hours in a vessel adapted for distillation. During this period, 41.7 parts of liquid distilled off. This liquid contained 0.5 part of hexamethylcyclotrisiloxane, 26.8 parts of octamethylcyclo tetrasiloxane, 6.9 parts of decamethylcyclopentasiloxane and 3.5 parts of duodecamethylcyclohexasiloxane. The weights of distillate produced after one and two hours reaction were 35.7 and 40.1 parts respectively.

Example 2

75 parts of the polysiloxane composition used in Example 1 were reacted with 3.7 parts of anhydrous aluminium chloride by heating at 350° C. 49.3 parts of distillate were collected from this reaction during a period of 2 hours. This distillate contained 0.885 part of hydrogen chloride and 1.13 parts of hexamethylcyclotrisiloxane, 32.6 parts of octamethylcyclotetrasiloxane, 8.1 parts of decamethylcyclopentasiloxane and 3.4 parts of duodecamethylcyclohexasiloxane.

Example 3

75 parts of the polysiloxane composition used in Example 1 were heated with 1.88 parts of aluminium chloride at 300° C. for 5 hours in a vessel adapted for distillation. After 3 hours 14.3 parts of liquid had distilled off and after 5 hours, 18.6 parts had been collected. The final product contained 0.48 part of hexamethylcyclotrisiloxane, 10.1 parts of octamethylcyclopentasiloxane and 2.06 parts of duodecamethylcyclohexasiloxane.

Example 4

75 parts of partially cured siloxane gum composition consisting of 100 parts of a trimethylsilyl end-stopped dimethylpolysiloxane gum, 35 parts of a fume silica ("Aerosil" FK3), 3 parts of (tetramethylethylenedioxy) dimethylsilane, 3 parts of a paste consisting of 50% benzoyl peroxide in a polysiloxane oil ("Luperco" A.G.E.) and 1 part of ferric oxide were reacted with 3.8 parts of phosphorus pentachloride by heating under reflux for 1 hour and thereafter heating at 300° C. for 3 hours. After 1, 2 and 3 hours' heating at 300° C., 31.2, 43.0 and 45.0 parts respectively of distillate were collected. The final distillate contained 26.6 parts of octamethylcyclotetrasiloxane, 9.2 parts of decamethylcyclopentasiloxane and 2.3 parts of duodecamethylcyclohexasiloxane.

Example 5

75 parts of a siloxane composition similar to that of Example 4 were reacted with 7.5 parts of aluminium chloride by heating at 300° C. for 1 hour in a vessel adapted for distillation. During this period, 45.5 parts of distillate collected. This distillate contained 1.05 parts of hexamethylcyclotrisiloxane, 30.4 parts of octamethylcyclotetrasiloxane, 9.5 parts of decamethylcyclopentasiloxane, 3.1 parts of duodecamethylcyclohexasiloxane.

Example 6

75 parts of the siloxane composition used in Example 5 were heated with 3.75 parts of aluminium bromide at 300° C. for 2.5 hours in a vessel adapted for distillation. During this period, 13.0 parts of liquid distilled off. This liquid was found to contain 0.11 part of hexamethylcyclotrisiloxane, 6.7 parts of octamethylcyclotetrasiloxane, 3.45 parts of decamethylcyclopentasiloxane and 1.05 parts of duodecamethylcyclohexasiloxane.

Example 7

75 parts of the siloxane composition used in Example 5 were reacted with 3.8 parts of phosphorus pentachloride by heating under reflux for 1 hour and thereafter heating at a temperature of 300° C. for 3 hours while distilling off the volatile products. After 1, 2 and 3 hours heating at 300° C., the amounts of distillate collected were respectively 31.2, 43 and 45 parts. The distillate was washed with cold dilute aqueous sodium hydroxide solution, washed with water and dried with anhydrous sodium sulphate and contained 27.9 parts of octamethylcyclotetrasiloxane, 9.7 parts of decamethylcyclopentasiloxane and 2.5 parts of duodecamethylcyclohexasiloxane.

Example 8

75 parts of the siloxane composition used in Example 5 were heated under reflux with 3.8 parts of phosphorus oxychloride for 30 minutes and thereafter heated for 3 hours at 300° C. After 1, 2 and 3 hours' heating at 300° C., 20.0, 34.5 and 37.5 parts respectively of liquid had distilled off. The final distillate after treatment in a manner similar to that described in Example 7 was found to contain 20.4 parts of octamethylcyclotetrasiloxane, 8.9 parts of decamethylcyclopentsiloxane and 2.7 parts of duodecamethylcyclohexasiloxane.

Example 9

75 parts of the siloxane composition used in Example 5 were heated under reflux with 3.75 parts of phosphorus trichloride for 30 minutes and thereafter heated for 3 hours at 300° C. During this period, 36.5 parts of liquid distilled off and was treated as in Example 9. The product so obtained contained 1.9 parts of hexamethylcyclotrisiloxane, 21.2 parts of octamethylcyclotetrasiloxane, 7.3 parts of decamethylcyclopentasiloxane and 1.85 parts of duodecamethylcyclohexasiloxane.

Example 10

A siloxane composition of the kind used in Example 5 was cured to an elastomer by heating for 10 minutes at 135° C. under pressure of 600 lb./sq. in. followed by heating for 1 hour in an oven at 150° C. and for 24 hours at 250° C. 75 parts of the elastomer so obtained were heated with 3.75 parts of aluminium chloride at 300° C. for 4.5 hours in a vessel adapted for distillation. During this period, 41.5 parts of liquid distilled off. This liquid contained 2.8 parts of hexamethylcyclotrisiloxane, 24.6 parts of octamethylcyclotetrasiloxane, 5.3 parts of decamethylcyclopentasiloxane and 2.0 parts of duodecamethylcyclohexasiloxane.

Example 11

75 parts of a product obtained by hydrolysis of dimethyldichlorsilane with water were heated with 3.75 parts of aluminium chloride at 300° C. in a vessel adapted for distillation and the volatile products distilled off and neutralised. This product was re-distilled to give 46 parts of a liquid containing 0.4 part hexamethylcyclotrisiloxane. 39.8 parts octamethylcyclotetrasiloxane and 5.8 parts decamethylcyclopentasiloxane.

Example 12

75 parts of a partially cured polysiloxane composition prepared from a composition consisting of 100 parts of a polysiloxane gum containing methyl and phenyl groups in the molar ratio of 15:1 and having a ratio of methyl plus phenyl groups to silicon atoms of 2:1, 45 parts of a silica aerosol ("Santocel" CS) and 3.3 parts of a paste consisting of 50% benzoyl peroxide in a polysiloxane oil ("Luperco" A.G.E.) were heated with 7.5 parts of anhydrous aluminium chloride at 300° C. for 1 hour in a vessel adapted for distillation. 50.5 parts of distillate were collected during this period. This consisted of 6 parts of benzene, 29.5 parts of octamethylcyclotetrasiloxane, 8.9 parts of decamethylcyclopentasiloxane, and 3.1 parts of duodecamethylcyclohexasiloxane.

Example 13

75 parts of a polysiloxane composition consisting of 100 parts of a dimethyl polysiloxane gum, 130 parts of "Whitetex" clay, 10 parts of a finely divided precipitated silica (Hi-Sil X303) and 6 parts of a paste consisting of 50% benzoyl peroxide in a polysiloxane oil ("Luperco" A.G.E.) were heated at 280° C. with 1.88 parts of aluminium chloride for 6 hours in a vessel adapted for distillation. The table below shows the rate of formation of the products of the reaction.

| Reaction time (hr.): | Distillate (parts) |
|---|---|
| 1 | 8.5 |
| 2 | 14.8 |
| 3 | 18.3 |
| 4 | 20.2 |
| 5 | 21.6 |
| 6 | 22.1 |

The final distillate contained 12.7 parts of octamethylcyclotetrasiloxane, 3.8 parts of decamethylcyclopentasiloxane and 1.1 parts of duodecamethylcyclohexasiloxane.

Example 14

75 parts of the polysiloxane composition used in Example 13 were heated with 3.75 parts of anhydrous aluminium chloride at 300° C. for 2 hours in a vessel adapted for distillation. 25.8 parts of distillate containing 0.3 part of hexamethylcyclotrisiloxane, 16.3 parts of octamethylcyclotetrasiloxane, 4.7 parts of decamethylcyclopentasiloxane and 1.7 parts of duodecamethylcyclohexasiloxane were obtained.

Example 15

A portion of the polysiloxane composition used in Example 13 was cured by heating at 135° C. for 10 minutes under a pressure of 600 lb./sq. in. followed by heating in an oven at 150° C. for 24 hours. 75 parts of this cured material were heated with 3.7 parts of anhydrous aluminium chloride at 300° C. for 2 hours in a vessel adapted for distillation during which time 26 parts of distillate were collected. The distillate contained 18.3 parts of octamethylcyclotetrasiloxane, 4.2 parts of decamethylcyclopentasiloxane and 1.5 parts of duodecamethylcyclohexasiloxane.

*Example 16*

75 parts of the polysiloxane composition used in Example 5 were heated at 300° C. for 2.5 hours with 3.8 parts of aluminium fluoride in a vessel adaped for distillation. During this period, 10 parts of liquid distilled off. This distillate contained 1.9 parts of hexamethylcyclotrisiloxane, 5.1 parts of octamethylcyclotetrasiloxane, 2.1 parts of decamethylcyclopentasiloxane and 0.4 part of duodecamethylcyclohexasiloxane.

What I claim is:

1. A process for the production of low molecular weight cyclic methyl polysiloxanes comprising reacting together a high molecular weight substantially linear methyl polysiloxane with a substance from the class consisting of halides of aluminium and halides of phosphorus in an amount not more than 30% by weight at not less than 250° C. under substantially anhydrous conditions and simultaneously distilling off the so-produced cyclic polysiloxanes.

2. A process according to claim 1 wherein the halide of aluminium or phosphorus is selected from the group consisting of aluminium chloride, aluminium fluoride, aluminium bromide, phosphorus trichloride, phosphorus pentachloride and phosphorus oxychloride.

3. A process according to claim 1 wherein the halide is used in amounts greater than 3% by weight of the polysiloxane.

4. A process according to claim 3 wherein the halide is used in amounts from 5 to 15%.

5. A process according to claim 1 wherein the methyl polysiloxane also contains at least one phenyl group.

6. A process according to claim 1 wherein the methyl polysiloxane also contains at least one vinyl group.

7. A process according to claim 1 wherein the polysiloxane is a polysiloxane elastomer.

8. A process according to claim 1 wherein the polysiloxane is a polysiloxane gum.

References Cited in the file of this patent
UNITED STATES PATENTS

| | | |
|---|---|---|
| 2,589,317 | Young et al. | Mar. 18, 1952 |
| 2,645,654 | Hyde | July 14, 1953 |